US012631333B2

(12) United States Patent (10) Patent No.: US 12,631,333 B2
Walters (45) Date of Patent: May 19, 2026

(54) FUEL INJECTOR

(71) Applicant: Rolls-Royce plc, London (GB)

(72) Inventor: Edward A. Walters, Derby (GB)

(73) Assignee: Rolls-Royce PLC, London (GB)

( * ) Notice: Subject to any disclaimer, the term of this patent is extended or adjusted under 35 U.S.C. 154(b) by 51 days.

(21) Appl. No.: 18/618,387

(22) Filed: Mar. 27, 2024

(65) Prior Publication Data

US 2025/0224114 A1 Jul. 10, 2025

(30) Foreign Application Priority Data

Apr. 12, 2023 (GB) ...................................... 2305347

(51) Int. Cl.
*F23R 3/28* (2006.01)
*F02C 3/22* (2006.01)

(52) U.S. Cl.
CPC ................ *F23R 3/283* (2013.01); *F02C 3/22* (2013.01); *F05D 2240/35* (2013.01)

(58) Field of Classification Search
CPC ...... F23R 3/04; F23R 3/10; F23R 3/12; F23R 3/14; F23R 3/36; F23R 3/283; F23R 3/286
See application file for complete search history.

(56) References Cited

U.S. PATENT DOCUMENTS

| | | | |
|---|---|---|---|
| 4,993,222 A | 2/1991 | Iwai et al. | |
| 6,367,262 B1 * | 4/2002 | Mongia | F23R 3/286 60/748 |
| 11,566,790 B1 * | 1/2023 | Hughes | F23R 3/20 |
| 11,867,399 B2 * | 1/2024 | Kim | F23R 3/34 |
| 12,050,062 B2 * | 7/2024 | Berry | F28D 1/0308 |
| 2004/0177619 A1 | 9/2004 | Sprouse et al. | |
| 2008/0078160 A1 | 4/2008 | Kraemer et al. | |
| 2010/0031661 A1 | 2/2010 | Varatharajan et al. | |
| 2010/0236247 A1 * | 9/2010 | Davis, Jr. | F23R 3/286 60/742 |
| 2013/0084224 A1 | 4/2013 | Ergut | |
| 2014/0083110 A1 * | 3/2014 | Stewart | F23R 3/286 60/737 |
| 2014/0338344 A1 | 11/2014 | Stewart et al. | |
| 2022/0356845 A1 | 11/2022 | Morenko et al. | |

OTHER PUBLICATIONS

European search report dated Jul. 15, 2024, issued in EP Patent Application No. 24160748.0.
Great Britain search report dated Oct. 9, 2023, issued in EP Patent Application No. 2305347.3.

* cited by examiner

*Primary Examiner* — Thuyhang N Nguyen

(57) ABSTRACT

A fuel injector for a hydrogen combusting aircraft gas turbine engine has at least one air through-passage extending axially from a front face to a rear face. The injector further comprises a fuel manifold in communication with a hydrogen fuel feed line. A plurality of fuel outlets is provided surrounding the or each air passage and an annular fuel gallery is provided around each air through passage configured to supply the fuel outlets, the annular fuel gallery communicating with the fuel manifold.

8 Claims, 9 Drawing Sheets

FUEL INJECTOR

CROSS-REFERENCE TO RELATED APPLICATIONS

This specification is based upon and claims the benefit of priority from United Kingdom Patent Application No. 2305347.3, filed on Apr. 12, 2023, the entire contents of which are incorporated herein by reference.

BACKGROUND

Technical Field

The present disclosure relates to a fuel injector for a hydrogen combusting gas turbine engine, a combustor comprising the injector, and a gas turbine comprising the combustor.

Description of the Related Art

In order to limit emissions of carbon dioxide, use of hydrogen as an alternative to hydrocarbon fuel in gas turbine engines has historically only been practical in land-based installations. However, hydrogen fueled airliners have recently been proposed.

Hydrogen combustion in aircraft gas turbines presents a number of challenges. Hydrogen burns very fast and at high temperatures, and consequently may produce relatively large quantities of oxides of nitrogen (NOx) when burned.

"Micro-mix" injectors have been proposed, in which a plurality of small fuel apertures is provided adjacent to a plurality of small air apertures. Flame miniaturisation has been shown to result in faster and improved mixing with air, short diffusion flames and reduced residence times. A large array of small flames produces a similar flame intensity as one large flame but with reduced NOx production. The design and construction of such injectors can be challenging owing to the complex internal arrangements required within the injector to provide the flows. Additionally, maintaining consistent air/fuel ratios within the various air/fuel streams is difficult.

SUMMARY

The invention is directed towards an injector for a hydrogen combusting gas turbine engine.

In a first aspect there is provided a fuel injector for a hydrogen combusting aircraft gas turbine engine having at least one air through-passage extending axially from a front face to a rear face;

a fuel manifold in communication with a hydrogen fuel feed line; wherein a plurality of fuel outlets is provided surrounding the or each air passage and an annular fuel gallery is provided around each air through passage configured to supply the fuel outlets, each annular fuel gallery communicating with the fuel manifold.

Advantageously, the design provides effective air/fuel mixing positions distributed across the face of the injector to achieve a micro-mix reduced NOx hydrogen fuel injector.

Each fuel outlet may be arranged to direct fuel towards air exiting a respective air through passage.

The injector may comprise an injector front plate which forms the front face of the injector, and an injector rear plate which forms the rear face of the injector, the injector front plate and injector rear plate being coupled together. The injector front plate and rear plate may be coupled by diffusion bonding or brazing.

The injector may comprise a feed plate located between the injector front plate and the injector rear plate. Advantageously, the additional feed plate enables adjustment of the feed hole sizes by the designer to adjust flow characteristics without affecting the design of the rear plate and front plate. As such, a common design can be utilised across different engines, with only the feed plate being altered between engines. This feature also enables the axial depth of the injector head to be adjusted without affecting the design of the rear plate and front plate. The injector feed plate may comprise a plurality of axially extending fuel through-holes and a plurality of axially extending air through-holes. The injector front plate, rear plate and feed plate may be coupled by diffusion bonding or brazing.

The injector front plate may comprise the fuel manifold and may comprise a plurality of axially extending air through-holes. The injector rear plate may comprise a plurality of axially extending air through-holes. When assembled, the axially extending air-through holes of the injector rear plate, injector feed plate and injector front plate may align to form a plurality of air through-passages.

The injector rear plate may comprise one or more fuel distribution channels which communicate between two or more annular fuel galleries. The annular fuel galleries may communicate with axially extending fuel through holes of the injector feed plate via the fuel distribution channels Alternatively, the injector may comprise a single air through-passage surrounded by a plurality of fuel outlets.

The single air through-passage may comprise a central, annular through-passage defined by a central body and an outer cylindrical wall.

The central body may comprise a blunt aft end configured to generate downstream vortices in use. Advantageously, the central body improves mixing of the fuel and air.

Each of the axially extending fuel through-holes of the injector feed plate may communicate with the fuel manifold of the injector front plate.

According to a second aspect of the invention there is provided a combustor for a gas turbine engine comprising a combustion chamber and a plurality of fuel injectors according to the first aspect of the invention.

According to a third aspect of the invention there is provided a gas turbine engine comprising a combustor according to the first aspect.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
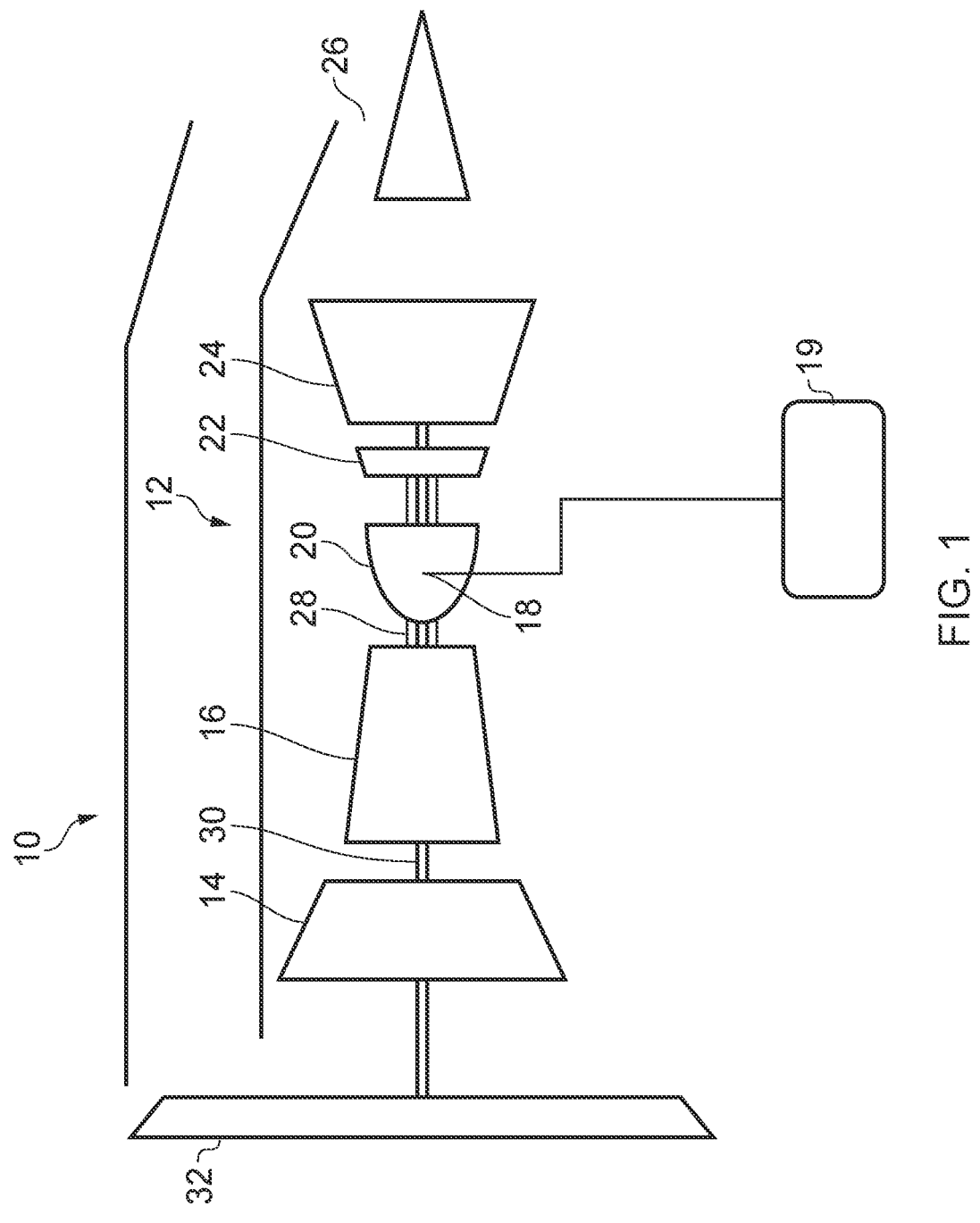
FIG. 1 shows a block diagram of a hydrogen-fueled turbofan engine.
Figure 2:
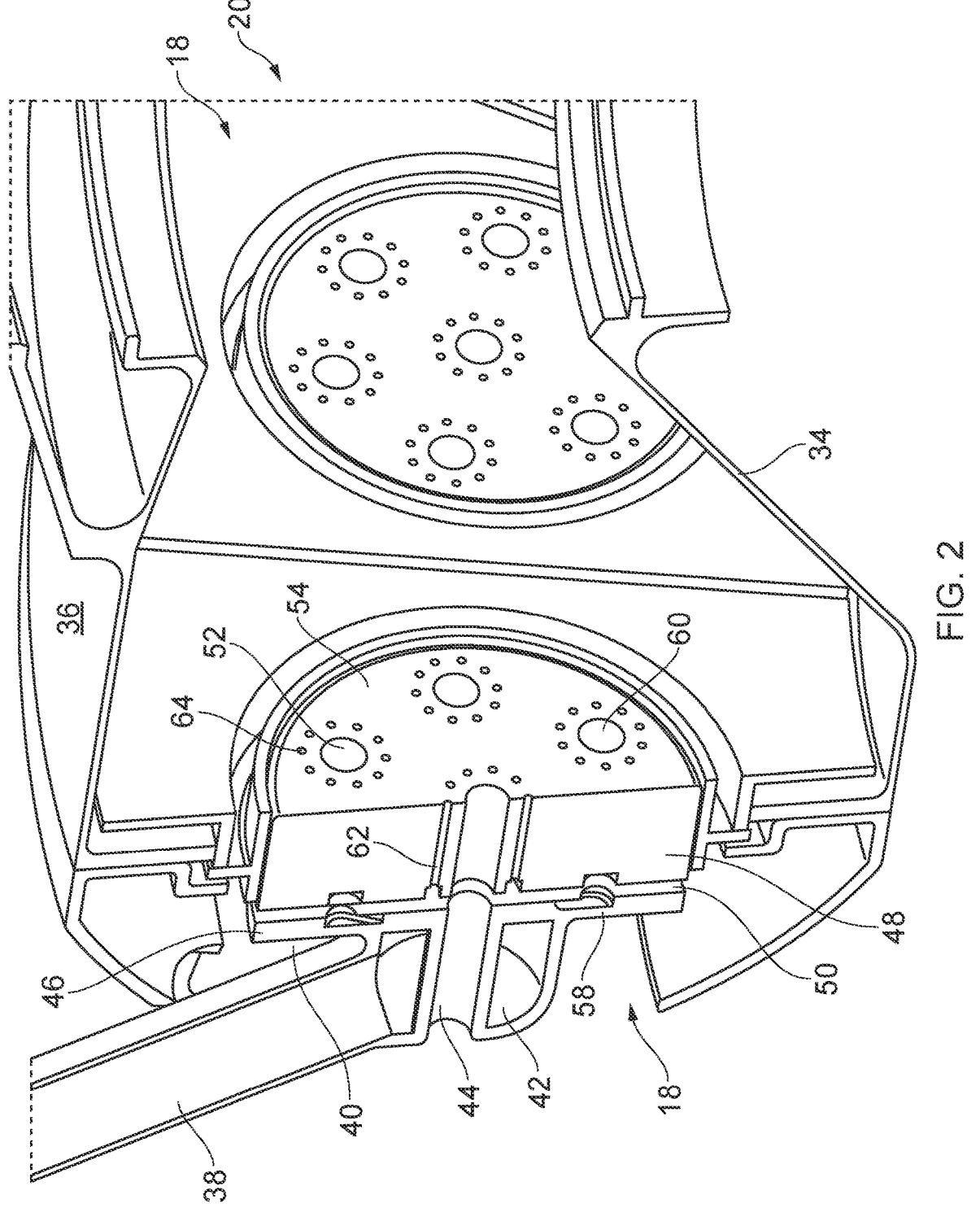
FIG. 2 is an isometric view from a rear of part of a first combustor of the engine of FIG. 1.

A block diagram of a hydrogen fueled gas turbine engine 10 is shown in FIG. 1.

The gas turbine engine 10 comprises a core gas turbine 12.

The core gas turbine 12 comprises, in fluid flow series, a low-pressure compressor 14, a high-pressure compressor 16, a fuel injection system 18, a combustor 20, a high-pressure turbine 22, a low-pressure turbine 24, and a core nozzle 26. The high-pressure compressor 16 is driven by the high-pressure turbine 22 via a first shaft 28, and the low-pressure compressor 14 is driven by the low-pressure turbine 24 via a second shaft 30. The gas turbine also comprises a fan 32 driven by the second shaft 30. It will be appreciated that in alternative embodiments, the core gas turbine could be of three-shaft configuration.

In operation, hydrogen fuel is pumped from a hydrogen storage tank 19, in either a liquid, supercritical or gaseous state to the fuel injection system 18. The fuel is typically a gas or a supercritical fluid once it arrives at the fuel injection system, but may still be relatively cold.

Elements of the combustor 20 are shown in further detail in FIGS. 2 to 6.

The combustor 20 comprises a plurality of fuel injectors 18, which are arranged in an annular configuration. The combustor 20 comprises a combustion chamber defined by radially inner 34 and outer 36 walls which extend annularly around the circumference of the combustor 20, and axially toward an outlet adjacent the high-pressure turbine 22. In use, fuel flows into the combustion chamber from the fuel injectors 18, while air flows into the combustion chamber both through the fuel injectors 18, and through dilution holes (not shown) in the combustion chamber walls 34, 36.

Each fuel injector 18 is supplied with fuel from a feed arm 38, which extends into the combustor from an annularly outer combustor casing (not shown), toward a front, axially forward-facing face 40 of each injector 18.

The feed arm 38 comprises a fuel manifold 42 at a distal end thereof, adjacent the front face 40 of the injector 18. The manifold 42 is configured to supply fuel to the injector 18, and comprises an annular chamber surrounding a central air passage 44, which extends in a generally axial direction through the feed arm, and into the front face 40.

Figure 3:
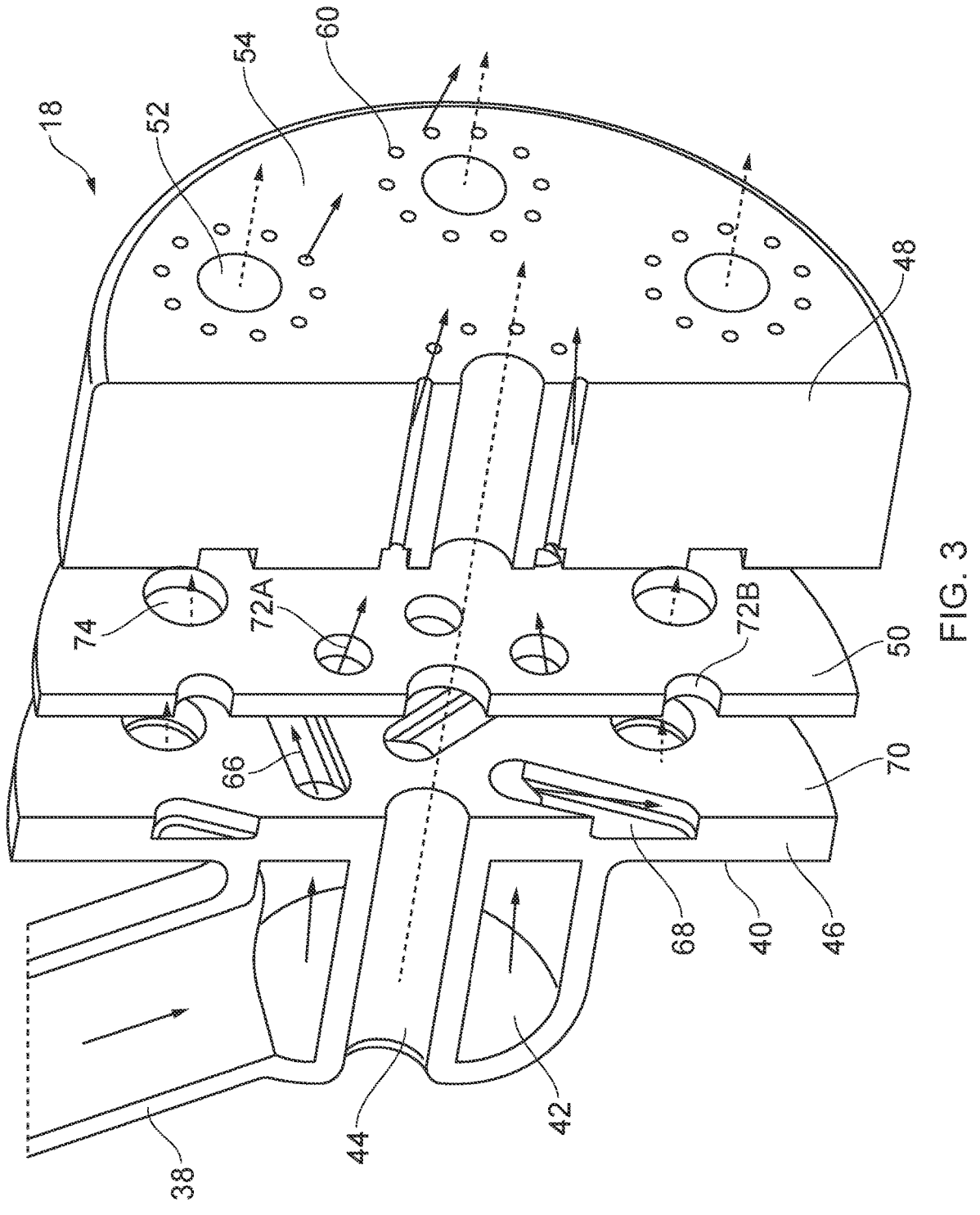
FIG. 3 is an exploded isometric view of a fuel injector of the combustor of FIG. 2 from a rear face.
Figure 4:
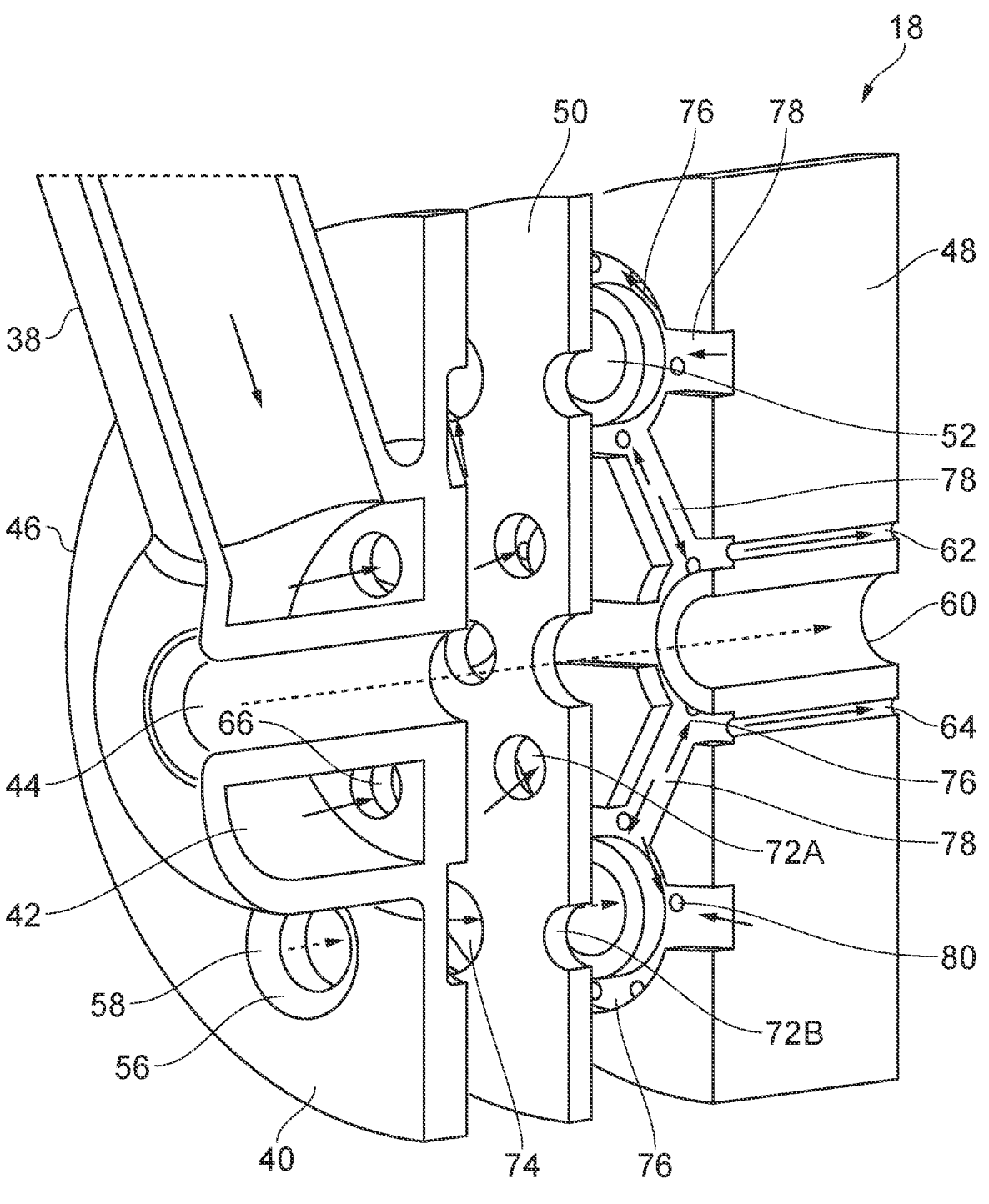
FIG. 4 is an exploded isometric view of the fuel injector of FIG. 3 from a rear face.

FIGS. 3 and 4 show an exploded view of parts of the injector 18. As can be seen, each injector 18 comprises three principal components—a first unitary component comprising the feed arm 38 and front injector plate 46, a second unitary component comprising a rear injector plate 48, and a third unitary component comprising a feed plate 50, which is provided axially between the rear and front plates 46, 48. Each plate 46, 48, 50 comprises through-holes, which enable fuel and air to flow through the injector to enable efficient mixing and distribution of air and fuel to enable combustion.

Referring again to FIG. 2, each injector comprises a plurality of air through-passages 52 arranged around a generally axially rearwardly facing injector rear face 54, which extend axially from the front face 40 of the injector front plate 46, through the feed plate 50, to provide an air flow path from a compressor outlet, through the injector 18 and into the combustion chamber 20. In the present embodiment, seven air through-passages 52 are provided, as shown more clearly in FIG. 6. Each air through-passage 52 is generally cylindrical, and comprises a chamfered edge 56 at an inlet end 58 at the front face 40 to ensure smooth flow into the passage, and a sharp edge at an outlet 60 at the rear face 54, to promote turbulent flow at the outlet 60.

Six of the air passages 52 are arranged in a ring adjacent an outer circumference of the rear plate 48, with a seventh 44 extending through a centre of the rear plate 48. The six air passages 52 arranged in a ring are supplied from inlets in the front face 40 around the central air passage 44. It will be understood that other arrangements of air through-passages 52 could be provided, with more or fewer passages arranged in a different pattern.

Arrayed around each air passage 52 is a plurality of fuel through-passages 62 which terminate at a fuel outlet 64 at the injector rear face 54. The fuel passages 62 also extend in a generally axial direction, though may be aligned somewhat inward toward the respective air passage outlet 60 to promote mixing. In the described embodiment, the fuel passages 62 are arranged as a ring, surrounding and spaced from a respective air outlet 60. In the described embodiment, each air outlet 60 is surrounded by nine fuel outlets 64, though it will be understood that fewer or more outlets 64 could be provided. Each fuel passage 62 is in communication with fuel from the fuel manifold 42. Again, the fuel outlets 64 are typically circular, and have a sharp outlet to promote turbulence.

It will be appreciated that delivering air to seven separate air outlets and sixty-three separate fuel outlets 64 could necessitate a complex arrangement for the fuel injector 18, which may be difficult to construct. Additionally, it is desirable to ensure consistent fuel and air flow between the different outlets to prevent hotspots from occurring, and ensuring good control of stoichiometry in the combustor 20. It is also desirable to have multiple flow paths between the fuel manifold 42 and each fuel outlet 64, such that blockages are prevented. For example, ice crystals may form in or around fuel passages during start-up where the fuel is cold. This may lead to difficulty starting, or uneven fuel/air ratios, which may in turn lead to unacceptable emissions of NOx. NOx emissions during start-up are particularly important, since the aircraft is in the vicinity of people on the ground, where air quality is most important. In the present arrangement, an arrangement which provides one or more of the above design considerations is provided with only three separate components.

Figure 5:
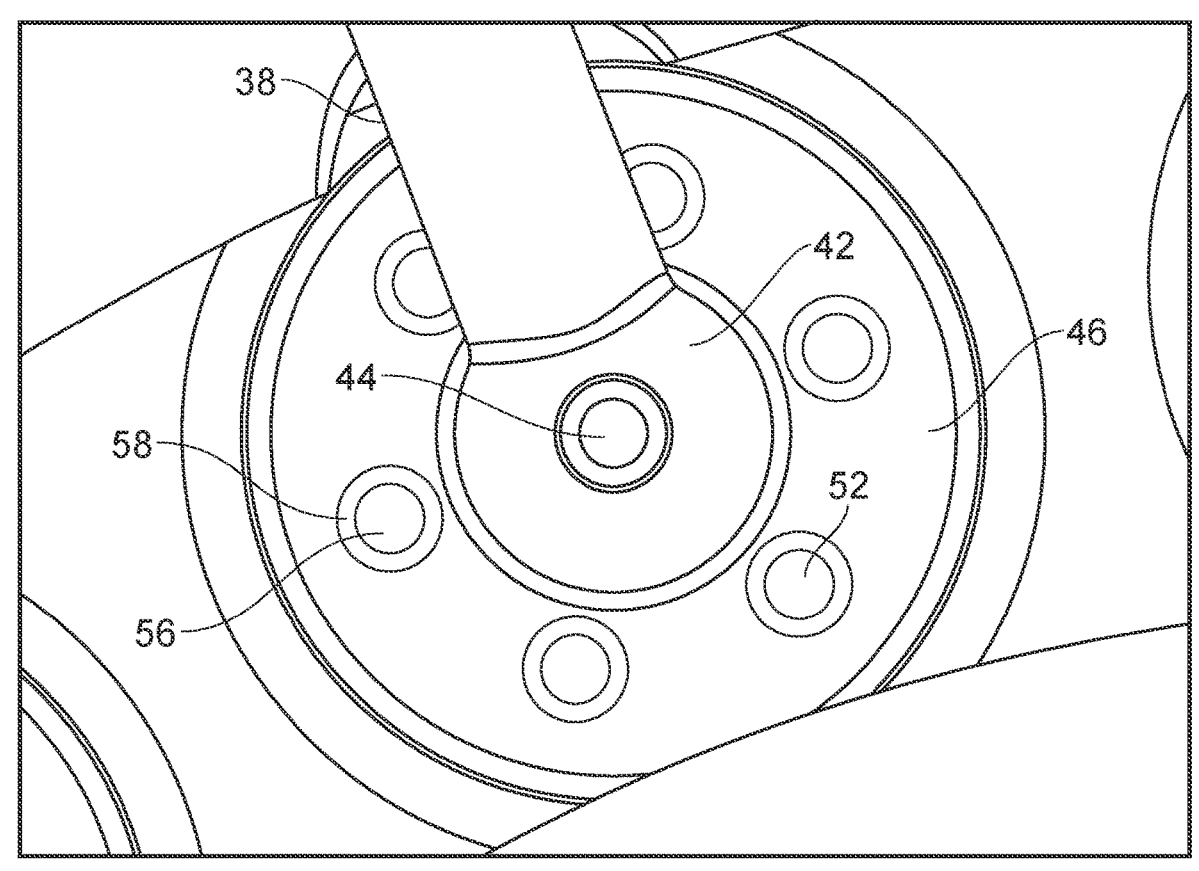
FIG. 5 is a rear view of the fuel injector of FIGS. 3 and 4.

Referring now to FIGS. 3, to 5, it can be described how fuel and air are delivered to the respective outlets 60, 64.

As shown most clearly in FIG. 4, the front injector plate 46 comprises a plurality of fuel inlet apertures 66, which extend into the fuel manifold 42 to receive fuel therefrom. In the present embodiment, six inlet apertures 66 are provided, though again different numbers of apertures could be provided in other embodiments.

As shown most clearly in FIG. 3, each fuel inlet aperture 66 communicates with a fuel channel 68 which is set into a rear face 70 of the front injector plate 46. Each fuel channel 68 extends generally normal to the axial direction, across the rear face 70 of the front injector plate 46, and communicates with at least two fuel through-holes 72A, 72B in the injector feed plate 48. Typically, the fuel channels 68 are formed in the injector plate 46 by a near net shape casting or injection moulding process, and/or may be machined into the face of the injector plate 46 by a milling or other material removal process.

Figure 6:
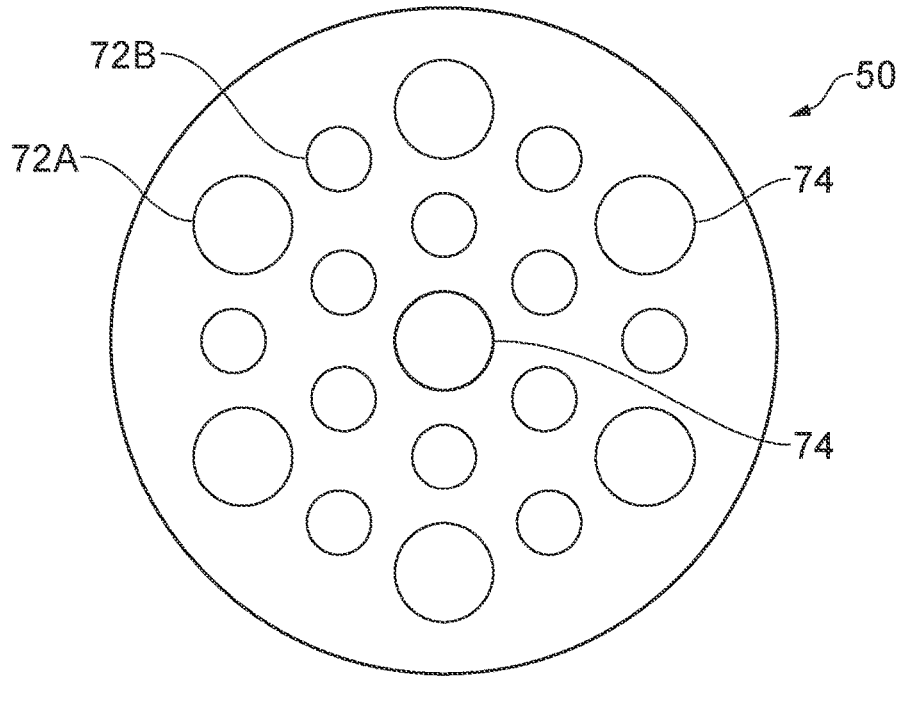
FIG. 6 is a front view of an injector feed plate of the fuel injector of FIGS. 3 to 5.
Figure 7:
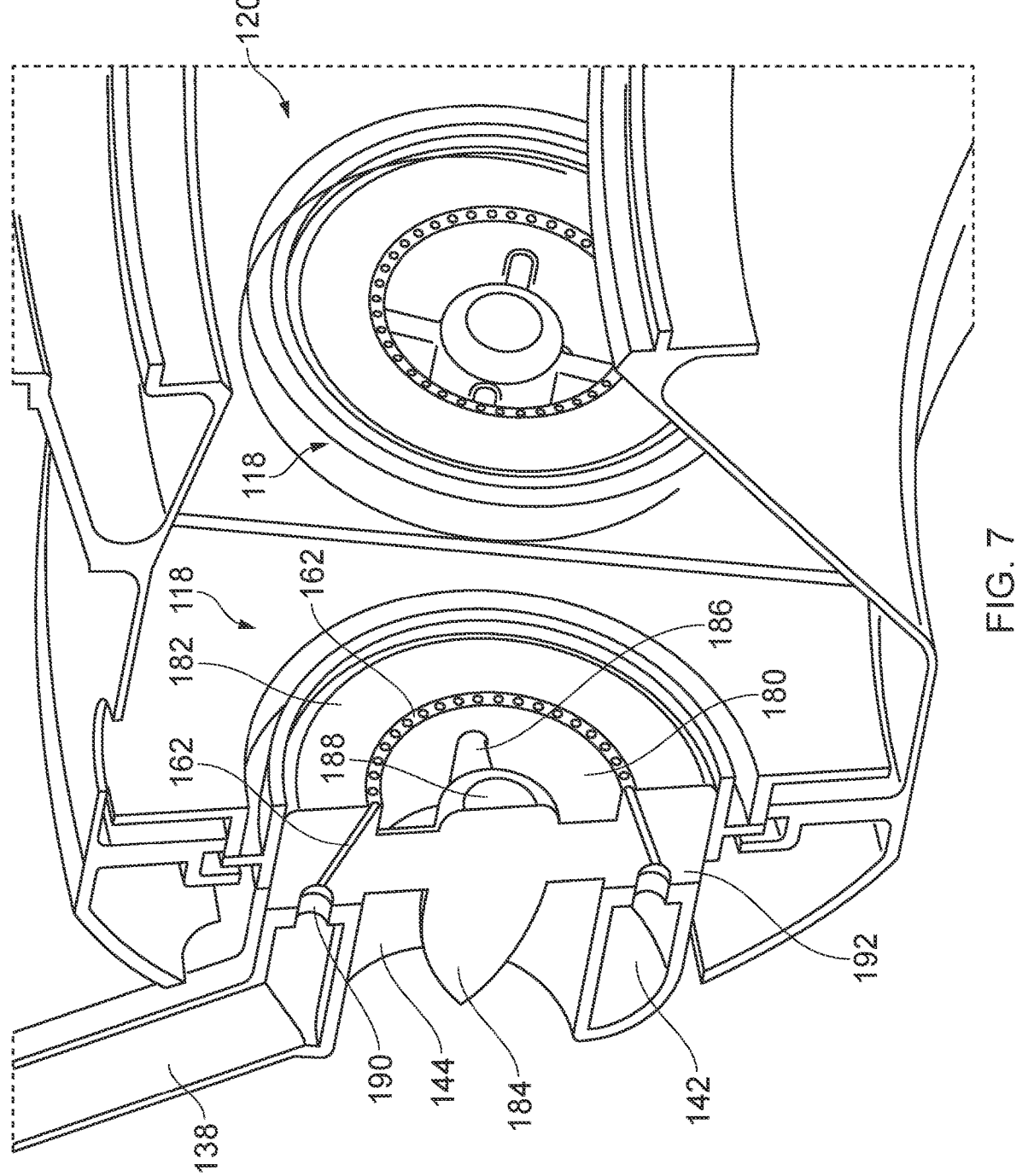
FIG. 7 is an isometric view from a rear of part of an alternative combustor for the engine of FIG. 1.
Figure 8:
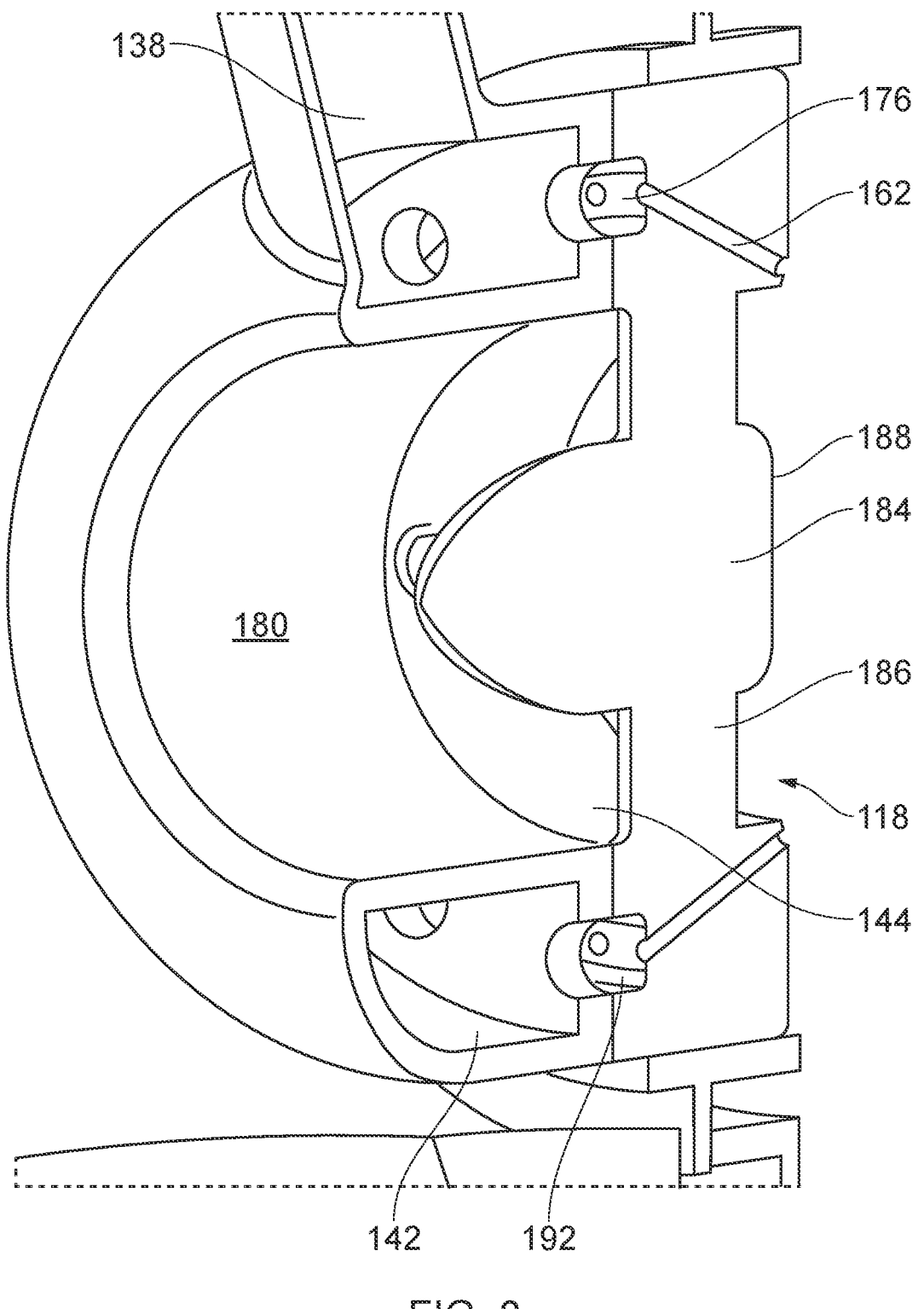
FIG. 8 is an isometric cut-through view through part of the combustor of FIG. 7 from a front view.
Figure 9:
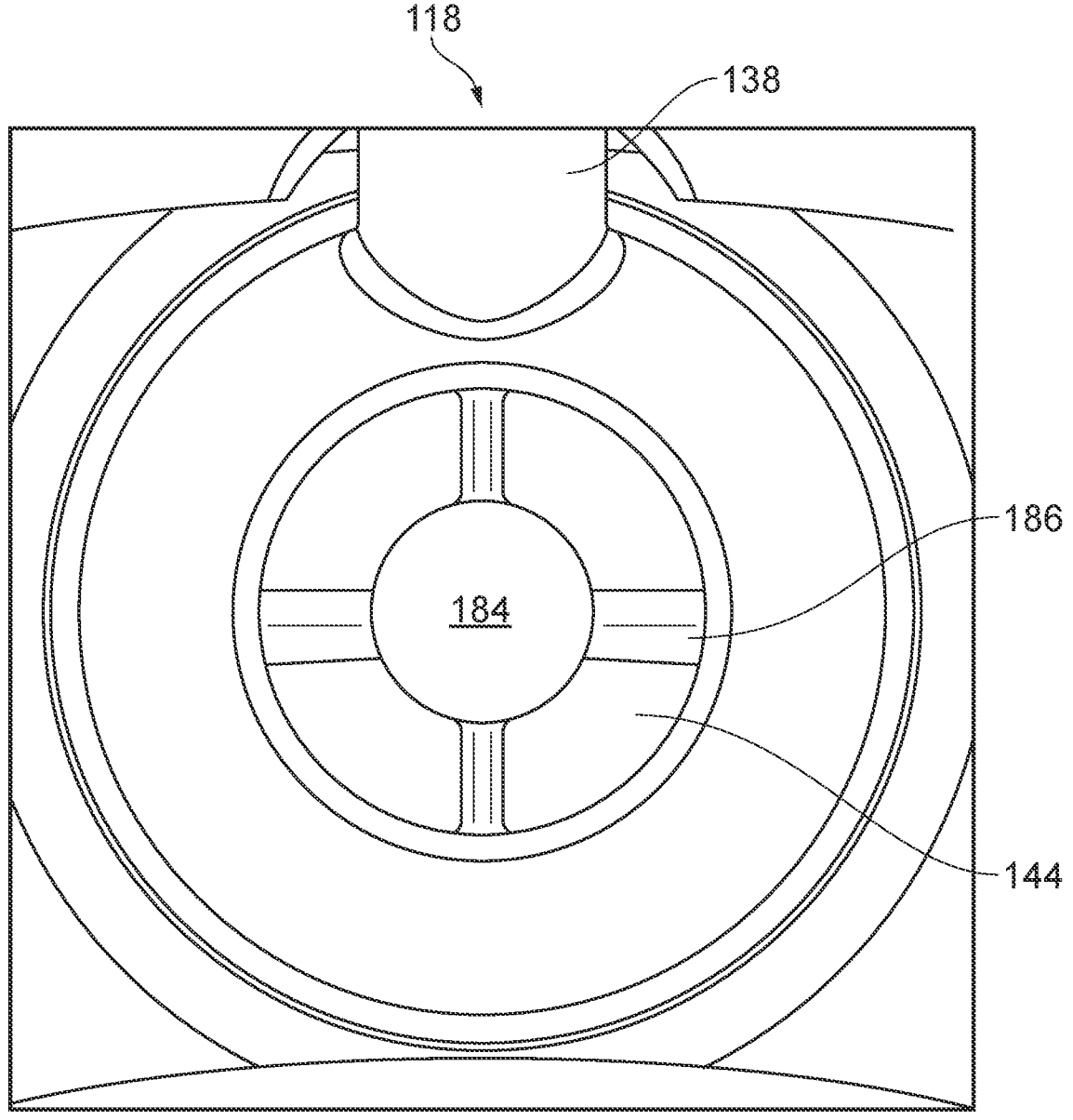
FIG. 9 is a front view of the fuel injector of the combustor of FIG. 7.
Figure 10:
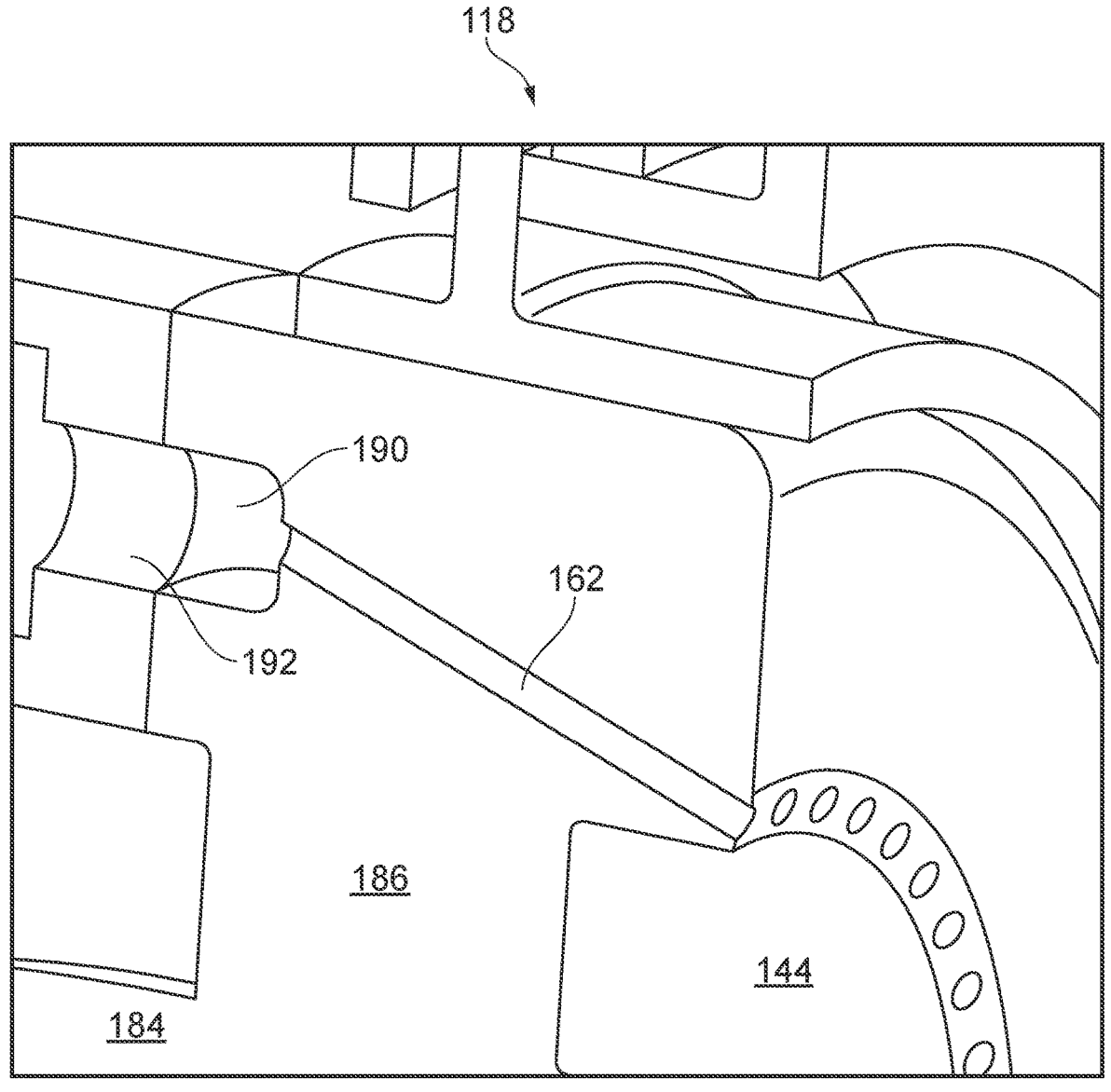
FIG. 10 is an isometric cut-through view of part of the injector of the combustor of FIG. 7.

The injector feed plate 50 is shown in more detail in FIG. 6. The injector feed plate 50 is generally disc shaped, and comprises a plurality of through holes, comprising first and second sets of fuel through-holes 72A, 72B and a set of air through-holes 74.

The seven air through-holes 74 are distributed in the same pattern as the air outlets 60 and are aligned with a respective outlet, such that the injector feed plate 50 provides a straight-through passage for air from the front face 40 to the rear face 54 of the injector 18.

The first set of fuel through-holes 72A is arranged to form a ring, in communication with and aligned with the inlet apertures 66 of the front injector plate 46 to provide a straight flow of fuel therethrough from the manifold 42.

The second set of fuel through-holes 72B is also arranged to a form a ring radially outward of the first set of fuel through holes 72A. Each fuel through hole of the second set 72B is aligned with a distal end of a respective fuel channel 68, such that fuel is supplied via the fuel channel 68, as can be seen from FIG. 3.

Referring now to FIG. 4, the injector rear plate 48 comprises a fuel distribution arrangement comprising an annular fuel gallery 76 extending around each air hole 52, and aligned with and in communication with the fuel passages 62 arranged around each air hole 52, which lead to respective fuel outlets 64. The annular fuel gallery 76 is set in to the injector rear plate 48, and may similarly be formed from a casting, injection moulding or milling process.

The fuel distribution arrangement further comprises a plurality of distribution channels 78, which communicate between annular fuel galleries. The fuel through holes 72A, 72B are aligned with and in communication with the distribution channels 78.

The distribution channels 78 are arranged such that each annular fuel gallery 76 communicates with at least one further annular fuel gallery 76, and in the present embodiment, each annular fuel gallery 76 communicates with three other annular fuel galleries 76. Distribution channels 78 are provided between the annular fuel gallery 76 surrounding the central air passage 44 and the ring of air passages 52. Additional fuel distribution channels 78 are provided between each air passage 52 in the ring. Each of the first set of fuel through-holes 72A of the feed plate 50 are aligned with a central part of the fuel distribution channels 78 which extend between the annular fuel galleries 76 surrounding the central air passage 44, and the outer ring of air passages 52. The second set of fuel through-holes 72B are aligned with the distribution channels 78 which extend between the annular channels 78 arranged in a ring around the circumference of the rear injector plate 48.

Consequently, each fuel outlet 60 is provided with fuel via the annular fuel gallery 76 in either a clockwise or anti-clockwise direction, and also from any one of three distribution channels 78. Consequently, a blockage in any one of a part of an annular channel 76, distribution channel 78 or fuel through hole 72A 72B does not prevent fuel from flowing to any fuel outlet. Additionally, pressure throughout the injector is equalised by the various flow paths, thereby preventing hot spots, flame outs and uneven distribution of fuel, which might result in uneven air/fuel mixtures, and so poor control of NOx emissions.

It can now be explained how fuel and air flow through each injector 18 with the air of the arrows shown in FIGS. 3 to 5, in which solid arrows represent fuel flow, and dashed arrows represent air flow.

Fuel is initially supplied through the feed arm 38 to each injector 18. Fuel from the feed arm 38 then collects in the fuel manifold 42, and is supplied under relatively even flow conditions to each fuel inlet aperture 66 of the injector front plate 46.

Fuel from the manifold 38 flows through the fuel inlet apertures directly through the first set of fuel through-holes 72A in the injector feed plate 50, and through the second set of fuel through-holes 72B via the fuel channels 68.

Fuel then enters the distribution channels 78 from the fuel through holes 72A, 72B, and is distributed to the annular fuel galleries 76. Fuel then flows around the annular fuel galleries 76, and out through the fuel outlets 60 in the injector rear face via the fuel passages 62.

On the other hand, the air flow through the injector 18 follows a relatively straight path through the injector. Each of the respective air through holes 44, 74, 52 in the injector front plate, rear plate and feed plate 46, 48, 50 are axially aligned, such that air flows uninterrupted in an axial direction. Consequently, a relatively high air velocity can be maintained, while pressure losses are reduced. Additional air flow may then be added from the dilution holes (not shown).

Consequently, the disclosed arrangement provides an effective means of providing fuel and air to a large number of small outlets, while being robust to blockages, and ensuring that even distribution of air and fuel is provided throughout the injector. Additionally, the arrangement is simple to construct, requiring only three separate components, which can be brazed or otherwise joined together to form a single part for installation in the gas turbine engine.

FIGS. 7 to 10 illustrate an alternative combustor 120 for the engine 10, which differs in the arrangement of the air and fuel holes.

As in the previous arrangement, the combustor 120 comprises a plurality of injectors 118. Each injector 118 comprises a feed-arm 138, which provides fuel to each injector 118, and at least partly mounts the injector to a combustor casing. The feed-arm 138 defines an annular fuel manifold 142.

The feed-arm 138 is coupled to a single-piece injector head 182. Typically, the feed-arm 138 and injector head 182 are brazed or diffusion bonded together. In other embodiments, the single-piece injector head could comprise multiple components joined together.

A single air through-passage 144 is provided for each injector 118. The air through-passage 144 is annular, and comprises a generally cylindrical aperture having an axis extending generally parallel to the air flow direction within the combustor 120.

The air through-passage 144 is bounded at a radially outer side by an outer wall 180, which is defined by the injector head 182. An inner wall of the air through-passage is defined by a central body 184, which is configured to condition air-flow through the air through-passage 144.

The body 184 has a generally conical profile at a forward end, to aid air-flow around the body 184. At an axially central region, a plurality of generally radially extending support struts 186 are provided, which again are profiled at their forward end to minimise air flow disruption.

The body 184 comprises a blunt aft end 188. As will be understood, the blunt end 188 at the aft end of the body 184 will tend to cause flow separation, and thus cause eddies or vortices in the air flow downstream of the body 184. Such vortices improve mixing in the region downstream of the body 184.

Radially outward of the air through-passage are a plurality of fuel passages 162, which are provided in a ring within the injector head 182. Each fuel passage 162 extends between an annular fuel gallery 176 formed from a recess in the injector head where it meets the fuel feed arm 138, which is in turn supplied with fuel from the fuel manifold 181 in the feed arm 138 via a plurality of fuel through-holes 192. Each fuel passage 162 is angled radially inward, such that fuel emanating from each fuel passage 162 is directed towards the air-flow emanating from the air through-passage 144. As such, fuel/air mixing is improved, resulting in rapid combustion, relatively small flames and low NOx emissions.

Any of the features disclosed herein may be employed separately or in combination with any other features and thus the disclosed subject-matter extends to and includes all such combinations and sub-combinations of the or more features described herein. Alternative embodiments of the disclosed design are also envisaged.

For example, the injector could be utilised with mixed fuels, for example other gaseous fuels such as hydrocarbon fuels. Different numbers and configurations of the fuel and air passages could be used. The arrangement could be constructed by other methods, such as 3D printing, to form a single unitary injector, or could be split into further components for ease of construction or maintenance.

The invention claimed is:

1. A fuel injector for a hydrogen combusting aircraft gas turbine engine comprising:
   at least one air through-passage extending axially from a front face to a rear face;
   a fuel manifold in communication with a hydrogen fuel feed line;
   a plurality of fuel outlets surrounding a plurality of air through-passages;
   an annular fuel gallery provided around each of the plurality of air through-passages configured to supply the fuel outlets, each of the annular fuel galleries communicating with the fuel manifold;
   an injector front plate which forms the front face of the injector;

an injector rear plate which forms the rear face of the injector;
      wherein the injector front plate and injector rear plate are coupled together;
   a feed plate located between the injector front plate and the injector rear plate comprising a plurality of air through-holes;
   wherein the injector rear plate comprises one or more fuel distribution channels which communicate between two or more of the annular fuel galleries; and
   wherein the annular fuel galleries communicate with axially extending fuel through holes in the injector feed plate via the fuel distribution channels.

2. A fuel injector according to claim 1, wherein each fuel outlet of the plurality of fuel outlets is arranged to direct fuel towards air exiting a respective air through-passage.

3. A fuel injector according to claim 1, wherein the injector front plate, rear plate and feed plate are coupled by diffusion bonding or brazing.

4. A fuel injector according to claim 1, wherein, when assembled, the axially extending air through-holes of the injector rear plate, injector feed plate and injector front plate align to form a plurality of the plurality of air through-passages.

5. A fuel injector according to claim 1, wherein the injector front plate comprises the fuel manifold and comprises a plurality of axially extending air through-holes.

6. A fuel injector according to claim 1, wherein the injector rear plate comprises a plurality of axially extending air through-holes.

7. A combustor for a gas turbine engine comprising a combustion chamber and a plurality of fuel injectors according to claim 1.

8. A gas turbine engine comprising a combustor according to claim 7.

* * * * *